(12) United States Patent
Bolanos Chaverri et al.

(10) Patent No.: US 11,371,699 B2
(45) Date of Patent: Jun. 28, 2022

(54) INTEGRATED FRONT PANEL FOR A BURNER

(71) Applicant: General Electric Company, Schenectady, NY (US)

(72) Inventors: Felipe Bolanos Chaverri, Lucerne (CH); Dariusz Oliwiusz Palys, Gebenstorf (CH); Andre Theuer, Baden (CH); Jeffrey De Jonge, Baden (CH)

(73) Assignee: General Electric Company, Schenectady, NY (US)

(*) Notice: Subject to any disclaimer, the term of this patent is extended or adjusted under 35 U.S.C. 154(b) by 70 days.

(21) Appl. No.: 16/680,550

(22) Filed: Nov. 12, 2019

(65) Prior Publication Data

US 2021/0140638 A1 May 13, 2021

(51) Int. Cl.
*F23R 3/00* (2006.01)
*F02C 7/18* (2006.01)

(52) U.S. Cl.
CPC ........... *F23R 3/002* (2013.01); *F02C 7/18* (2013.01); *F05D 2240/35* (2013.01); *F23R 2900/00012* (2013.01)

(58) Field of Classification Search
CPC ............ F23R 3/002; F23R 2900/00012; F23R 2900/00014; F02C 7/18; F05D 2240/35; F05D 2260/963
See application file for complete search history.

(56) References Cited

U.S. PATENT DOCUMENTS

| | | | |
|---|---|---|---|
| 5,253,471 A * | 10/1993 | Richardson | F23R 3/10 60/804 |
| 5,396,759 A * | 3/1995 | Richardson | F23R 3/10 60/804 |
| 7,413,053 B2 | 8/2008 | Wasif et al. | |
| 9,097,184 B2 | 8/2015 | Stryapunin et al. | |
| 10,215,418 B2 | 2/2019 | Metternich et al. | |
| 10,220,474 B2 | 3/2019 | Theuer et al. | |
| 10,221,769 B2 | 3/2019 | Imfeld et al. | |
| 10,228,138 B2 | 3/2019 | Theuer et al. | |

(Continued)

FOREIGN PATENT DOCUMENTS

| | | |
|---|---|---|
| EP | 3296638 A1 | 3/2013 |
| EP | 2913588 A1 | 9/2015 |

(Continued)

OTHER PUBLICATIONS

Alstom, GT24/GT26 Gas Turbine, Clean/High Performance/Flexible, 2007, pp. 1-20 (Year: 2007).*

(Continued)

*Primary Examiner* — Arun Goyal
*Assistant Examiner* — Henry Ng
(74) *Attorney, Agent, or Firm* — Dority & Manning, P.A.

(57) ABSTRACT

A turbomachine includes a compressor and a turbine with a burner and a combustor between the compressor and the turbine. The burner is downstream of the compressor and upstream of the turbine. The burner is connected to the combustor at a front panel of the burner. The front panel includes a frame, a rim extending around a central aperture within the frame, and a seal segment. The frame, the rim, and the seal segment are all integrally formed as a single unitary body.

19 Claims, 6 Drawing Sheets

(56) References Cited

U.S. PATENT DOCUMENTS

| | | |
|---|---|---|
| 10,260,749 B2 | 4/2019 | Harding |
| 10,859,270 B2 | 12/2020 | Imfeld et al. |
| 2009/0042154 A1 | 2/2009 | Riemer et al. |
| 2011/0005233 A1* | 1/2011 | Sadig .................. F23M 20/005 60/754 |
| 2011/0314825 A1 | 12/2011 | Stryapunin et al. |
| 2015/0075168 A1* | 3/2015 | De Jonge .................. F02C 7/24 60/725 |
| 2015/0113990 A1* | 4/2015 | Eroglu ................ F23M 20/005 60/725 |
| 2015/0377487 A1* | 12/2015 | Tonon .................... F01N 1/026 60/725 |
| 2016/0076772 A1* | 3/2016 | Metternich ............. F23R 3/002 60/772 |
| 2016/0102864 A1 | 4/2016 | Metternich et al. |
| 2017/0096919 A1* | 4/2017 | Imfeld ...................... F23R 3/42 |
| 2018/0080653 A1* | 3/2018 | Imfeld .................... F23R 3/346 |
| 2018/0156460 A1 | 6/2018 | Theuer et al. |
| 2018/0156461 A1* | 6/2018 | Theuer .................... F23R 3/002 |
| 2020/0370478 A1 | 11/2020 | Biagioli et al. |
| 2021/0080106 A1 | 3/2021 | Hakim Doisneau et al. |

FOREIGN PATENT DOCUMENTS

| | | |
|---|---|---|
| EP | 2913588 A1 | 9/2015 |
| JP | 2005/090304 A | 4/2005 |
| JP | 2005090304 A1 | 4/2005 |
| WO | 2013144070 A1 | 10/2013 |

OTHER PUBLICATIONS

Alstom, GT24/GT26 Gas Turbine, Clean/High Performance/Flexible, 20 Pages.

European Search Report Corresponding to Application No. 20206289 dated Mar. 5, 2021.

European Patent Office, Extended EP Search Report for corresponding EP Application No. 20206289.9, dated Mar. 15, 2021.

* cited by examiner

INTEGRATED FRONT PANEL FOR A BURNER

FIELD OF THE TECHNOLOGY

The subject matter disclosed herein relates to a burner for a turbomachine. More specifically, the disclosure is directed to a front panel of a burner which is integrally formed.

BACKGROUND

Turbomachines, such as gas turbine engines, typically comprise an inlet section, a compression section, one or more burners, a combustion chamber, and a turbine section. The inlet section may include a series of filters, cooling coils, moisture separators, and/or other devices to purify and otherwise condition a working fluid (e.g., air) entering the gas turbine. The working fluid flows downstream from the inlet section to a compressor section where kinetic energy is progressively imparted to the working fluid to produce a compressed working fluid at a highly energized state. The compressed working fluid is mixed with a fuel from a fuel supply to form a combustible mixture within one or more burners. The combustible mixture is burned by the one or more burners to provide combustion gases having a high temperature and pressure to a combustion chamber. The combustion gases flow through a turbine of a turbine section wherein energy (kinetic and/or thermal) is transferred from the combustion gases to rotor blades, thus causing a shaft to rotate and produce work. For example, the rotation of the shaft may drive the compressor to produce the compressed working fluid. Alternately or in addition, the shaft may connect the turbine to a generator for producing electricity. Exhaust gases from the turbine flow through an exhaust section that connects the turbine to an exhaust stack downstream from the turbine. The exhaust section may include, for example, a heat recovery steam generator for cleaning and extracting additional heat from the exhaust gases prior to release to the environment.

The burners of such turbomachines typically adjoin the combustion chamber via a front panel of the burner. The front panel may also include damping features. A seal segment can be attached and welded to the front panel of the burner. The seal segment may be used to connect the front panel of the burner to a membrane seal and to an inner carrier to form a burner plenum.

Constructing and assembling the seal segment and the front panel of separate parts can introduce limitations into the design of the burner plenum. For example, the seal segment may conflict with or constrain the possible locations for the damping features on some front panels.

Accordingly, it is recognized in the art that there is a need for improved front panels for burners which provide sealing features and damping features.

BRIEF DESCRIPTION OF THE TECHNOLOGY

Aspects and advantages are set forth below in the following description, or may be obvious from the description, or may be learned through practice.

In one example embodiment of the present disclosure, a front panel for a burner of a turbomachine is provided. The turbomachine defines an axial direction, a radial direction perpendicular to the axial direction, and a circumferential direction extending around the axial direction. The front panel includes a frame comprising an outer portion extending along the circumferential direction from a first side portion to a second side portion. The frame also includes an inner portion spaced apart from the outer portion along the radial direction by the first side portion and the second side portion. The inner portion of the frame extends along the circumferential direction from the first side portion to the second side portion. The front panel also includes a rim extending around a central aperture within the frame. The rim extends from the frame along the axial direction and is configured to join with a downstream end of the burner. The front panel also includes a seal segment connected to the inner portion of the frame. The frame, the rim, and the seal segment are all integrally formed as a single unitary body.

In another example embodiment of the present disclosure, a turbomachine is provided. The turbomachine defines an axial direction, a radial direction perpendicular to the axial direction, and a circumferential direction extending around the axial direction. The turbomachine includes a compressor, a turbine, a combustor disposed downstream from the compressor and upstream from the turbine, and a burner disposed downstream from the compressor and upstream from the turbine. The burner is connected to a front panel. The front panel of the burner includes a frame comprising an outer portion extending along the circumferential direction from a first side portion to a second side portion. The frame also includes an inner portion spaced apart from the outer portion along the radial direction by the first side portion and the second side portion. The inner portion of the frame extends along the circumferential direction from the first side portion to the second side portion. The front panel also includes a rim extending around a central aperture within the frame. The rim extends from the frame along the axial direction and is configured to join with a downstream end of the burner. The front panel also includes a seal segment connected to the inner portion of the frame. The frame, the rim, and the seal segment are all integrally formed as a single unitary body.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the of various embodiments, including the best mode thereof to one skilled in the art, is set forth more particularly in the remainder of the specification, including reference to the accompanying figures, in which.

DETAILED DESCRIPTION

Figure 1:
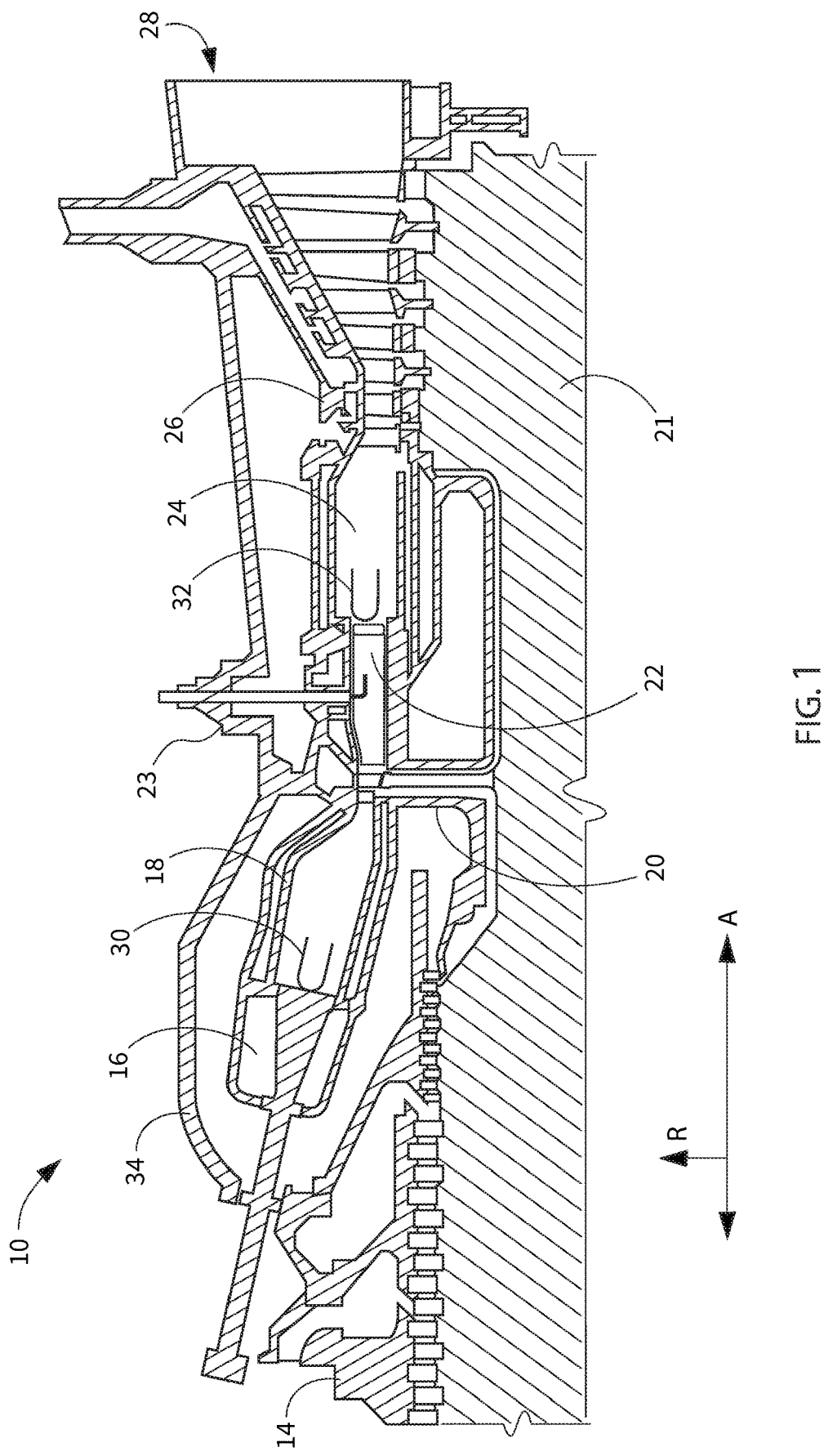
FIG. 1 illustrates a section view of an exemplary gas turbine that may incorporate various embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although exemplary embodiments of the present disclosure will be described generally in the context of a combustion system for a land based power generating gas turbine for purposes of illustration, one of ordinary skill in the art will readily appreciate that embodiments of the present disclosure may be applied to any style or type of combustor for a turbomachine and are not limited to combustors or combustion systems for land based power generating gas turbines unless specifically recited in the claims.

Referring now to the drawings, FIG. 1 provides a section view of an exemplary gas turbine engine 10 that may incorporate various embodiments of the present invention. As shown, the gas turbine engine 10 generally includes an inlet (not shown), a compressor 14 disposed downstream of the inlet, at least one burner 16 disposed downstream of the compressor 14, a combustor or combustion chamber 18 disposed downstream of the burner 16, a turbine 20 disposed downstream of the combustor 18 and an exhaust section 28 disposed downstream of the turbine 20. Additionally, the gas turbine engine 10 may include one or more shafts 21 that couple the compressor 14 to the turbine 20. The shaft(s) 21 may extend along and define an axial direction A. The gas turbine engine 10 may further define a radial direction R perpendicular to the axial direction A, and a circumferential direction C (FIGS. 2 and 3) extending around the axial direction A.

In some embodiments, for example as illustrated in FIG. 1, the gas turbine engine 10 may include a sequential combustion system. In such embodiments, the burner 16 may be a primary burner 16, and the gas turbine engine 10 may further include a sequential burner 22. Also, the turbine 20 may be a high pressure turbine 20 and a low pressure turbine 26 may be disposed downstream of a sequential combustor 24, where the sequential combustor 24 receives combustion gases from the sequential burner 22. The low-pressure turbine 26 generally includes a larger number of stages than the high pressure turbine 20; e.g., as illustrated in FIG. 1, the high pressure turbine 20 includes a single stage with one nozzle or stator vane and one rotor blade downstream of the one stator vane, whereas the low pressure turbine 26 includes, e.g., three or more stages, such as at least three sets of stator vanes and rotor blades.

During operation, air flows through the inlet and into the compressor 14 where the air is progressively compressed, thus providing compressed air to the burner 16. The burner 16 may be at least partially surrounded by an outer casing 34 such as a compressor discharge casing. The compressor discharge casing 34 may at least partially define a high pressure plenum that at least partially surrounds various components of the combustor 18. The compressor discharge casing 34 may be in fluid communication with the compressor 14 so as to receive the compressed air therefrom.

At least a portion of the compressed air is mixed with a fuel within the burner 16 and burned to produce combustion gases 30. The combustion gases 30 flow from the burner 16 into and through the combustor 18 and to the turbine 20, wherein energy (kinetic and/or thermal) is transferred from the combustion gases 30 to one or more rotor blade(s) (such as a single rotor blade in the illustrated example where the turbine 20 is a single stage high pressure turbine), thus causing shaft 21 to rotate. The mechanical rotational energy may then be used for various purposes such as to power the compressor 14 and/or to generate electricity. The combustion gases 30 exiting the turbine 20 may then, in some embodiments, be exhausted from the gas turbine engine 10 via the exhaust section 28, while in other embodiments, e.g., as illustrated in the FIG. 1, the combustion gases 30 exiting the high pressure turbine 20 may be mixed with additional fuel and burned in a sequential burner 22 downstream of the high pressure turbine 20. For example, such additional fuel may be supplied to the sequential burner 22 by a retractable fuel lance 23. The sequential burner 22 may generate combustion gases 32 within the sequential combustor 24, which are directed to the low-pressure turbine 26, as mentioned above.

Figure 2:
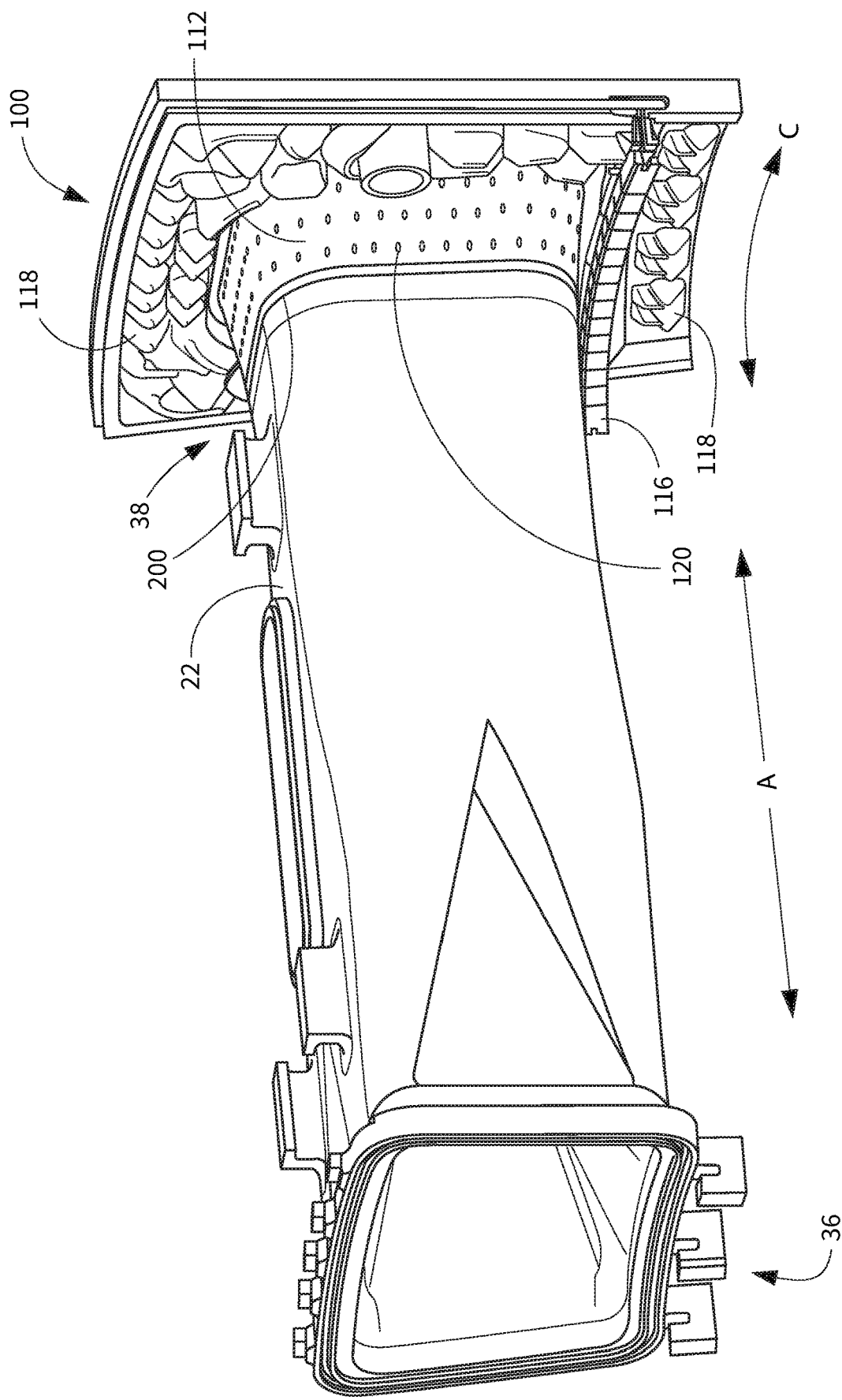
FIG. 2 illustrates a perspective view of a burner with an exemplary front panel according to at least one embodiment of the present disclosure joined thereto.

As illustrated in FIG. 2, the sequential burner 22 may be connected to the sequential combustor 24 (FIG. 1) via a front panel 100. As shown in FIG. 2, the sequential burner 22 extends along the axial direction from an upstream end 36 to a downstream end 38. The downstream end 38 of the sequential burner 22 may be connected to the front panel 100. For example, the downstream end 38 of the sequential burner 22 may be joined with the front panel 100, such as by welding the front panel 100 onto the burner 22 at the downstream end 38 of the burner 22. For example, as illustrated in FIG. 2, the front panel 100 may be joined to the downstream end 38 of the sequential burner 22 by a weld joint or seam 200.

Figure 3:
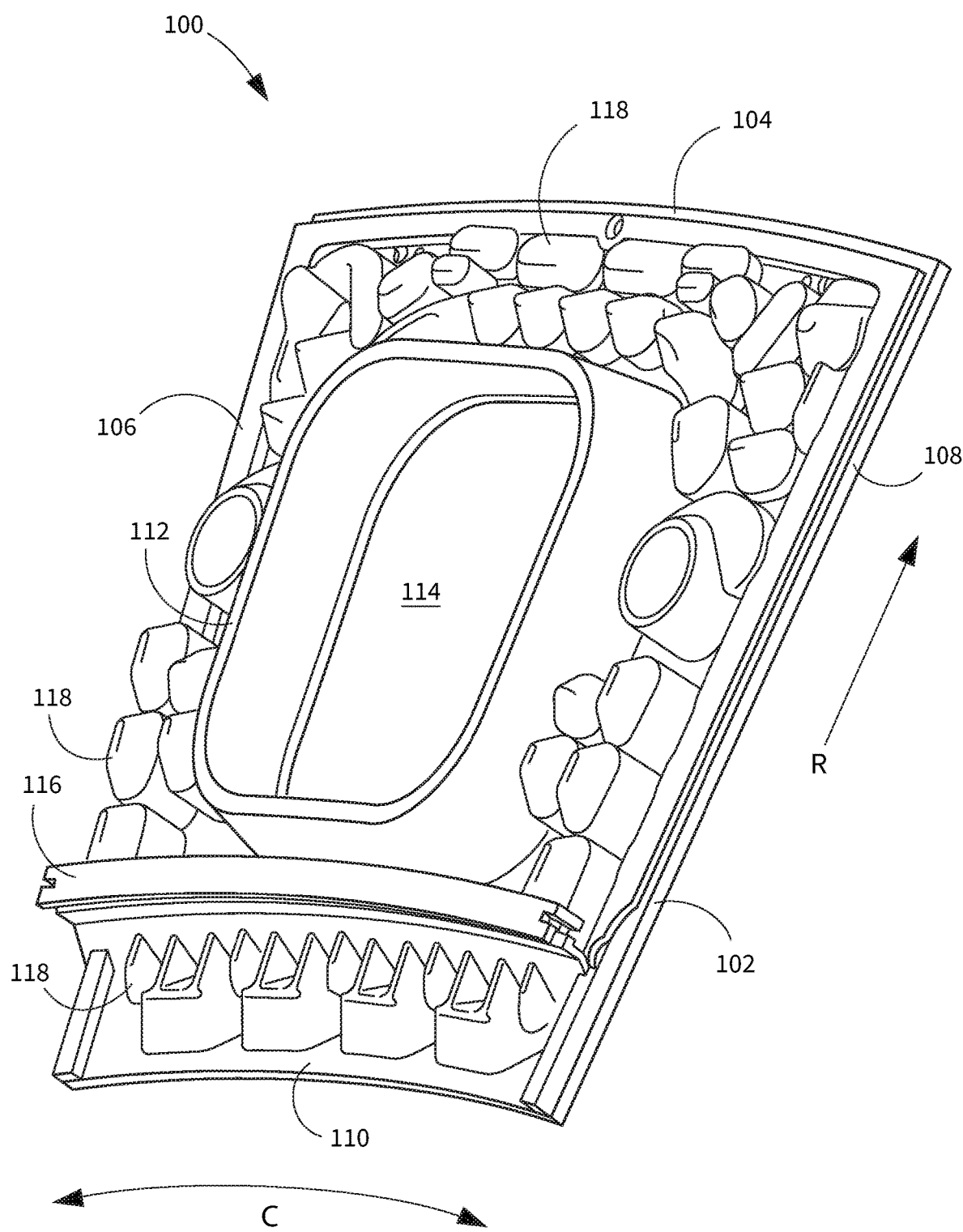
FIG. 3 is a perspective view of the front panel of FIG. 2.

FIG. 3 provides a perspective view of the front panel 100. As may be seen in FIG. 3, the front panel 100 includes a frame 102 and a rim 112, e.g., a central rim 112, surrounding and defining a central aperture 114. The frame 102 generally surrounds the rim 112, and the rim 112 is located in or about an approximate geometric center of the frame 102. The central rim 112 may include cooling features, such as cooling holes 120, as in the illustrated example embodiments. As may be seen in FIG. 3, the frame 102 includes an outer portion 104, which extends along the circumferential direction C from a first side portion 106 to a second side portion 108, and an inner portion 110 spaced apart from the outer portion 104 along the radial direction R by the first side portion 106 and the second side portion 108. The first side portion 106 and the second side portion 108 extend along the radial direction R from the inner portion 110 to the outer portion 104. The inner portion 110 extends along the circumferential direction C from the first side portion 106 to the second side portion 108. Also as illustrated in FIG. 3, the central rim 112 of the front panel 100 extends away from the frame 102 along the axial direction A, e.g., in an axially upstream direction, such that the central rim 112 extends from the frame 102 to the downstream end 38 of the sequential burner 22 when the front panel 100 is joined to the burner 22, as illustrated in FIG. 2.

The frame 102, the rim 112, and a seal segment 116 are all integrally formed as a single unitary body. For example, in some embodiments, the frame 102, the rim 112, and the seal segment 116 may be integrally formed as a single unitary body by forming the components in an additive manufacturing process. In additional embodiments, the frame 102, the rim 112, and the seal segment 116 may be integrally formed as the single unitary body using any suitable method, such as by casting the frame 102, the rim 112, and the seal segment 116, or by forming the frame 102, the rim 112, and the seal segment 116 using additive manufacturing techniques such as, but not limited to, direct metal laser melting (DMLM), selective laser sintering (SLS), or other suitable techniques.

The front panel 100 may also include one or more dampers 118, e.g., resonators, such as Helmholtz resonators, disposed in and around the frame 102. For example, the dampers 118 may also be integrally formed with the single unitary body, which also includes the frame 102, the rim 112, and the seal segment 116, as described above. As may be seen in the section views of FIGS. 4 and 5, each damper 118 may include an internal volume 119, which is configured, e.g., sized and shaped, to reduce pressure oscillations that may propagate, e.g., circumferentially, within the combustor 24. The operation of such dampers 118 is generally understood in the art and, as such, will not be described in further detail herein for sake of brevity and clarity.

Figure 4:
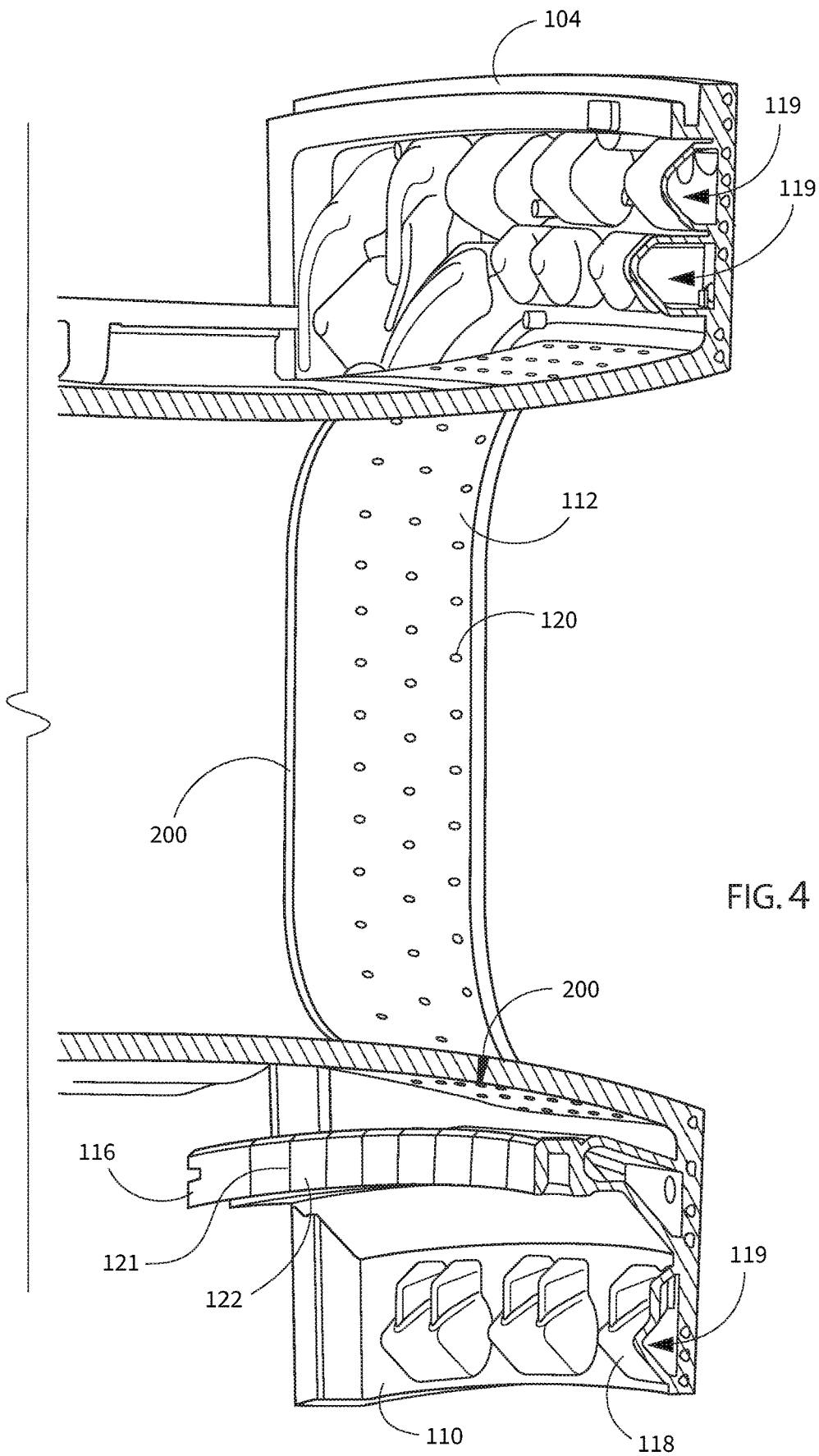
FIG. 4 is a section view of the front panel and a downstream portion of the burner of FIG. 2.

As best seen in FIGS. 3 and 4, the one or more dampers 118 may include multiple dampers 118, e.g., a plurality of dampers 118. For example, in some embodiments, the plurality of dampers 118 may include a first plurality of dampers 118 in the top portion 104 of the frame 102, a second plurality of dampers 118 in the first side portion 106 of the frame 102, a third plurality of dampers 118 in the second side portion 108 of the frame 102, and a fourth plurality of dampers 118 in the inner portion 110 of the frame 102. In some embodiments, the first plurality of dampers 118 in the outer portion 104 of the frame 102 may include two rows of dampers 118 spaced apart along the radial direction R, such as an outer row of dampers 118 proximate the exterior of the frame 102 and an inner row of dampers 118 proximate the central rim 112. In some embodiments, the second plurality of dampers 118 in the first side portion 106 of the frame 102 may include two rows of dampers 118 spaced apart along the circumferential direction C, such as an outer row of dampers 118 proximate the exterior of the frame 102 and an inner row of dampers 118 proximate the central rim 112, and the third plurality of dampers 118 in the second side portion 108 of the frame 102 may include two rows of dampers 118 spaced apart along the circumferential direction C, such as an outer row of dampers 118 proximate the exterior of the frame 102 and an inner row of dampers 118 proximate the central rim 112.

Figure 5:
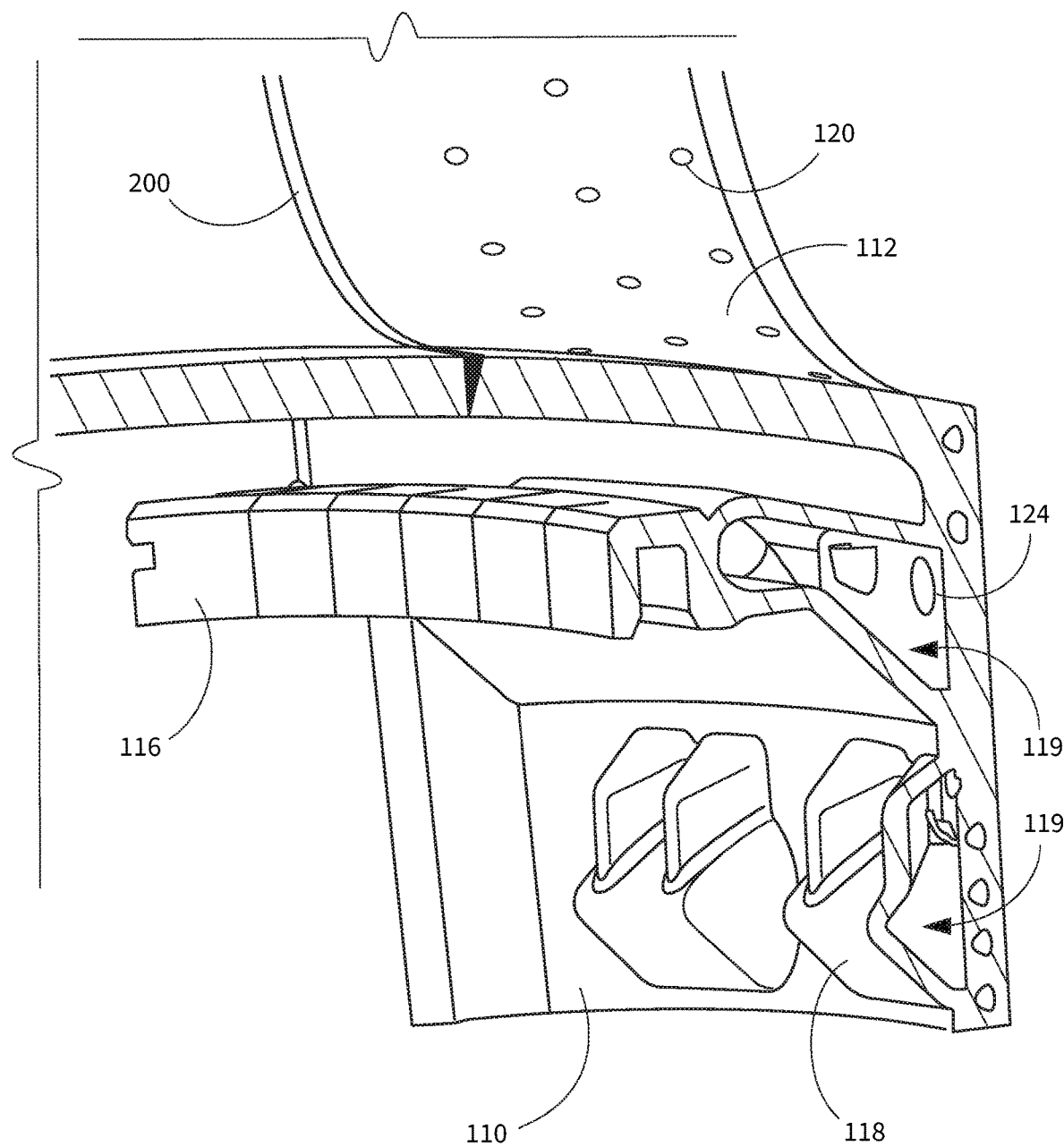
FIG. 5 is an enlarged view of a portion of FIG. 4.

Additionally, in at least some embodiments, the seal segment 116 may also include one or more dampers 118 integrated therewith, e.g., one or more dampers 118 may be directly integrated into the seal segment 116. For example, as may be seen in FIGS. 4 and 5, the seal segment 116 may also include one or more internal volumes 119 therein, whereby the seal segment 116 may also serve as a resonator, e.g., a Helmholtz resonator, as mentioned above. In particular, as shown in FIG. 5, each damper 118 may include an inlet 124 into, e.g., in communication with, the internal volume 119. It should be noted that the inlet 124 into the internal volume 119 of the damper 118, that is integrated directly into the seal segment 116, is by way of example only. Those of skill in the art will recognize that each damper 118 includes an inlet 124, and the inlet 124, as well as the internal volume 119, of each damper 118 may be varied, e.g., in shape and/or size, to provide damping of a desired frequency or range of frequencies.

Figure 6:
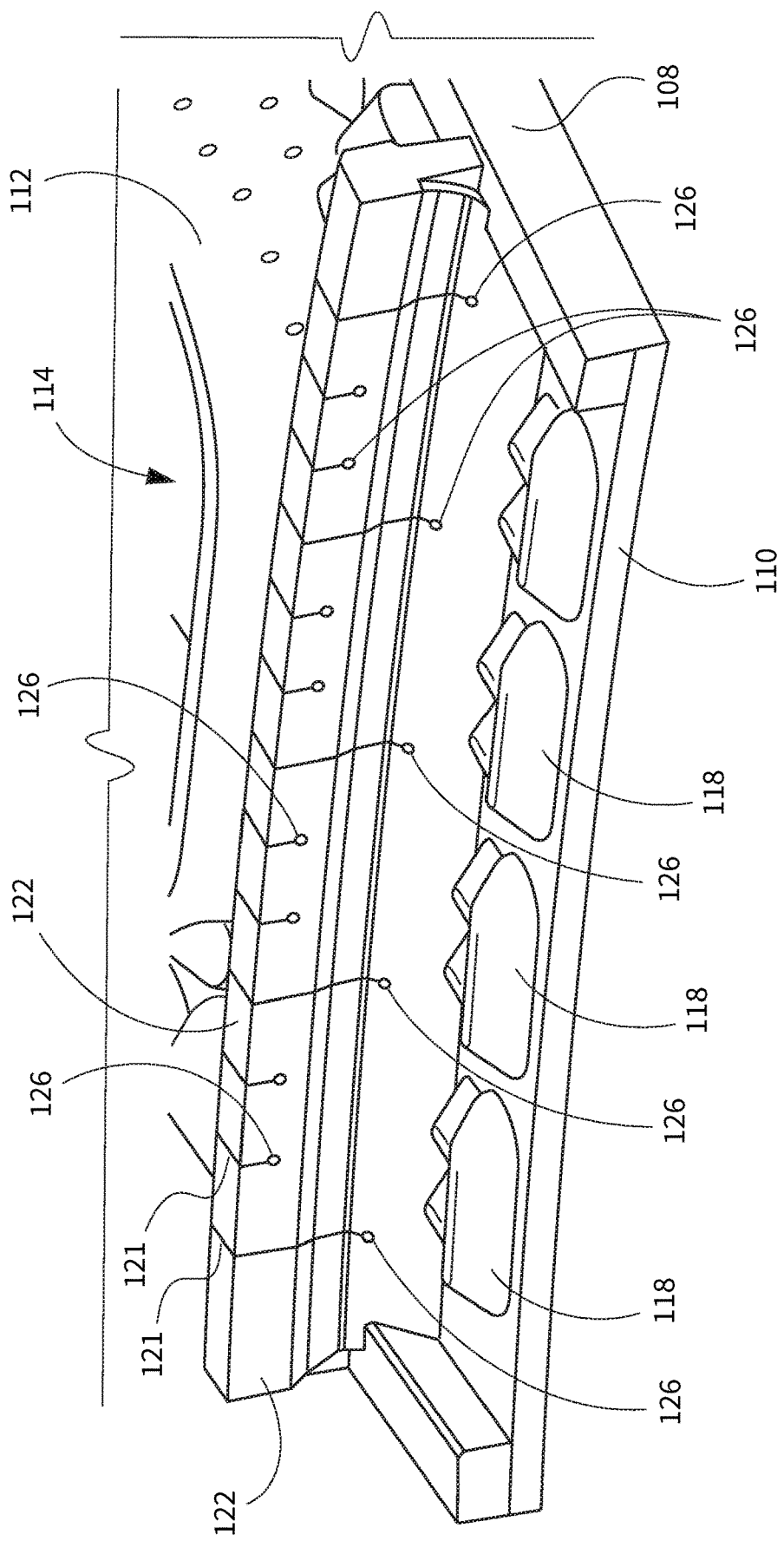
FIG. 6 is a perspective view of a portion of the front panel of FIG. 2.

As best seen in FIG. 6, the seal segment 116 may be discontinuous along the circumferential direction C. For example, the seal segment 116 may include a plurality of slits 121 extending along the axial direction A. For example, the slits 121 may be spaced apart along the circumferential direction C. Thus, the seal segment 116 may include a plurality of sub-segments 122 defined by and between the slits 121. In some embodiments, the slits 121 may have varying axial lengths, as illustrated in FIG. 6. Further, in some embodiments, one or more cooling holes 126, e.g., a plurality of cooling holes 126, may be formed in the seal segment 116. For example, as illustrated in FIG. 6, the cooling holes 126 may be positioned at an axial endpoint of one or more (up to and including each) of the slits 121 within the seal segment 116. Such circumferential discontinuity of the seal segment 116, e.g., the slits 121 and/or cooling holes 126, may permit air to flow through the seal segment 116, such as between the sub-segments 122 thereof, thereby providing convective cooling to the seal segment 116.

Forming the frame 102, the rim 112, the seal segment 116, and the dampers 118 integrally as a single unitary body provides numerous advantages, many of which will be apparent to those of ordinary skill in the art. For example, such advantages include promoting flexibility and cooling of the seal segment 116, e.g., the slits 121 may increase flexibility of the seal segment 116 and thereby provide increased life of the seal segment 116. Additionally, integration of the various parts, including direct integration of one or more dampers 118 into the seal segment 116, may resolve or avoid potential conflicts with locating multiple parts in the same or close positions, e.g., locating the seal segment 116 where a damper 118 should be (or vice versa).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. For example, the exemplary description in the foregoing pertaining to the inner corners of the aft frame can also be implemented at one or more outer corners of the aft frame as well as or instead of the inner corner(s). Such other examples are intended to be within the scope of the claims if they include structural elements that do not differ from the literal language of the claims, or if they include equivalent structural elements with insubstantial differences from the literal language of the claims.

What is claimed is:

1. A front panel for a burner of a turbomachine, the turbomachine defining an axial direction, a radial direction perpendicular to the axial direction, and a circumferential direction extending around the axial direction, the front panel comprising:
a frame comprising an outer portion extending along the circumferential direction from a first side portion to a second side portion, an inner portion spaced apart from the outer portion along the radial direction by the first side portion and the second side portion, the inner portion extending along the circumferential direction from the first side portion to the second side portion;
a rim extending around a central aperture within the frame, the rim extending from the frame along the axial direction and configured to join with a downstream end of the burner;
a seal segment connected to and extending along the inner portion of the frame; and
a plurality of dampers arranged on the inner portion of the frame radially inward of the seal segment;
wherein the frame, the rim, the plurality of dampers, and the seal segment are all integrally formed as a single unitary body, wherein each damper of the plurality of dampers defines a first internal volume and includes a first inlet defined in the frame and in fluid communication with the first internal volume, and wherein the seal segment defines a second internal volume and includes a second inlet defined in the frame and in fluid communication with the second internal volume.

2. The front panel of claim 1, wherein the plurality of dampers is integrally formed in the outer portion of the frame.

3. The front panel of claim 1, wherein the plurality of dampers is integrally formed in the first side portion of the frame and the second side portion of the frame.

4. The front panel of claim 1, wherein the seal segment is discontinuous along the circumferential direction.

5. The front panel of claim 1, wherein the seal segment comprises a plurality of slits extending along the axial direction, each slit of the plurality of slits spaced apart from one another along the circumferential direction, wherein each slit of the plurality of slits extends to an axial endpoint, and wherein a cooling hole is defined through the seal segment at the axial endpoint.

6. The front panel of claim 5, wherein the plurality of slits comprise various axial lengths.

7. The front panel of claim 1, further comprising a plurality of cooling holes formed in the rim.

8. The front panel of claim 1, wherein the frame comprises a forward surface and an aft surface, and wherein each damper of the plurality of dampers and the seal segment extend from the forward surface.

9. The front panel of claim 1, wherein the seal segment comprises a U-shaped hook portion extending from a closed end of the seal segment, the closed end partially defining the second internal volume of the seal segment.

10. The front panel of claim 9, wherein the seal segment comprises a plurality of slits defined in the U-shaped hook portion and extending along the axial direction, each slit of the plurality of slits spaced apart from one another along the circumferential direction.

11. A turbomachine defining an axial direction, a radial direction perpendicular to the axial direction, and a circumferential direction extending around the axial direction, the turbomachine comprising:
a compressor;
a turbine;
a combustor disposed downstream from the compressor and upstream from the turbine; and
a burner disposed downstream from the compressor and upstream from the turbine, the burner connected to a front panel, the front panel comprising:
a frame comprising an outer portion extending along the circumferential direction from a first side portion to a second side portion, an inner portion spaced apart from the outer portion along the radial direction by the first side portion and the second side portion, the inner portion extending along the circumferential direction from the first side portion to the second side portion;
a rim extending around a central aperture within the frame, the rim extending from the frame along the axial direction and configured to join with a downstream end of the burner;
a seal segment connected to and extending along the inner portion of the frame; and
a plurality of dampers arranged on the inner portion of the frame radially inward of the seal segment;
wherein the frame, the rim, the plurality of dampers, and the seal segment are all integrally formed as a single unitary body, wherein each damper of the plurality of dampers defines a first internal volume and includes a first inlet defined in the frame and in fluid communication with the first internal volume, and wherein the seal segment defines a second internal volume and includes a second inlet defined in the frame and in fluid communication with the second internal volume.

12. The turbomachine of claim 11, wherein the plurality of dampers is integrally formed in the outer portion of the frame.

13. The turbomachine of claim 11, wherein the plurality of dampers is integrally formed in the first side portion of the frame and the second side portion of the frame.

14. The turbomachine of claim 11, wherein the seal segment is discontinuous along the circumferential direction.

15. The turbomachine of claim 11, wherein the seal segment comprises a plurality of slits extending along the axial direction, each slit of the plurality of slits spaced apart from one another along the circumferential direction.

16. The turbomachine of claim 11, further comprising a plurality of cooling holes formed in the seal segment.

17. The turbomachine of claim 11, further comprising a plurality of cooling holes formed in the rim.

18. The turbomachine of claim 11, wherein the turbine is a low pressure turbine, the combustor is a sequential combustor, and the burner is a sequential burner, further comprising a high pressure turbine upstream of the sequential burner, a first combustor upstream of the high pressure turbine, and an additional burner upstream of the first combustor.

19. The turbomachine of claim 18, further comprising a retractable fuel lance configured to provide fuel to the sequential burner.

* * * * *